United States Patent Office 3,353,603
Patented Nov. 21, 1967

3,353,603
TREATMENT OF WELLS
Deral D. Knight, Houston, Tex., assignor to Byron Jackson Inc., Long Beach, Calif., a corporation of Delaware
No Drawing. Filed June 30, 1965, Ser. No. 468,600
5 Claims. (Cl. 166—42)

ABSTRACT OF THE DISCLOSURE

A method of acidizing calcareous and similar earth formations using an emulsion of aqueous hydrochloric acid, an emulsifying and acid retarding agent such as dodecylbenzenesulfonic acid or an alcohol sulfate drived from the reaction between straight chain primary alcohols with chlorosulfonic acid which is subsequently neutralized with a morpholene type nitrogen base, a corrosion inhibitor, a surfactant, and a hydrocarbon oil. The emulsion is forced into the calcareous earth formation.

This invention relates generally to the treatment of deep wells to increase the production of petroleum or gas therefrom, and more particularly to an improved method of acidizing a calcareous or magnesian oil bearing formation, an improved well treatment composition suitable for use in carrying out said acidizing method, and a method of preparing said composition.

It is a principal object of the invention to provide an improved method of treating calcareous or similar deposits in a well to stimulate the production of petroleum therefrom. Another object of the invention is to provide an improved well treating composition which is effectively retarded in its reaction with the formation, thereby allowing it to penetrate the formation more deeply before the acid is neutralized. Still another object of the invention is an improved method of preparing a relatively stable, oil-and-acid emulsion including corrosion inhibitors and acid retarding agents. Additional objects and advantages will be apparent from the following detailed description.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

One difficulty which the prior art has been relatively unsuccessful in overcoming is the spontaneous, or at least premature, action of the acid on the formation. In other words, when the acid comes into initial contact with the formation, it is neutralized by the reaction between the acid and the calcareous-magnesian carbonates so that its reactive powers are greatly diminished before it can permeate or penetrate the formation to any substantial depth.

In the early work on acidizing processes, one of the major considerations was reducing the corrosive effect of the acid on the metal well casing, pumps, etc. To this end, several different approaches were taken: (1) directly inhibiting the corrosive action of the acid by using various inhibiting agents such as mercaptans, thio-phenols, soluble arsenate-arsenite compounds, etc; (2) employing an acid-in-oil emulsion in which the aqueous acid dispersed phase, is, in effect, shielded from the metal by envelopment in a hydrocarbon oil phase or (3) treating the well casing and other metal parts in some way, for example, by introducing a hydrocarbon oil prior to, or along with, the acid in the hope of coating the metal with a protective film of oil.

Based on the experience of using the various processes referred to above, some of which were never commercially feasible, it became apparent that the reaction rate of the acid was an important factor in increasing the permeability of the formation. This was particularly apparent in using the acid-in-oil emulsions. All other things being equal, the acid-in-oil emulsion should have a very slow reaction rate, yet the reaction time was still too short to permit the deep penetration of the well treating compositions into the formation.

A typical process is described, for example, in U.S. Patent 1,922,154 (De Groote), which utilizes an acid-in-oil emulsion which is pumped down into the formation under high pressure. Theoretically, by using an acid-in-oil emulsion, the acid cannot attack and corrode the well casing, liners, and other metallic parts in the well, but as the emulsion begins to penetrate the formation, the friction resulting from being forced into the porous deposit is effective to break the emulsion and release the acid to allow it to react with the formation in the vicinity of the well bore. This patent recognizes that it would be desirable to control the stability of the emulsion by adding a dormant demulsifier. Unfortunately, in deep well formations, the pressure required to force the emulsion into the formation is so great that the acid-in-oil emulsions break down almost immediately. While many acid retarding agents and emulsion stabilizers have been developed to permit deeper penetration of the treating fluid, they have been unsatisfactory for the most part.

It has also been a common belief by the prior art that in order for an emulsion to exhibit retardation in acidizing processes, it must be of the acid-in-oil-type where the hydrocarbon oil surrounds the acid dispersed therein and is effective in preventing the acid from contacting the formation. It is the prevalence of this belief that has probably been responsible for the prior art always moving in the direction of trying to provide more sophisticated acid retarding agents and means for stabilizing the emulsion to thereby delay the break-down of the continuous hydrocarbon oil phase surrounding the dispersed aqueous acid phase.

I have discovered that the effectiveness of the acidizing treatment can be greatly improved by using an oil-and-acid emulsion, said emulsion characterized by a hydrocarbon oil phase and a phase of chemically retarded acid which has been inhibited to reduce corrosion. This discovery that an oil-and-acid emulsion, preferably containing a corrosion inhibitor having surface active properties for the acid phase and an emulsifying agent which also retards the reactivity of the acid, is believed to be responsible for the improved efficiency of this method.

The improved acidizing emulsion of the present invention includes four major components:

(I) An aqueous solution of mineral acid capable of reacting with the formation to produce water soluble salts.

(II) 0.1 to 1.5% of a water soluble, organic surface active agent and acid retarder.

(III) 0.1 to 3.0% of a surface active, corrosion inhibiting agent.

(IV) Hydrocarbon oil—5–25%.

The percentages of components II, III and IV are based on the volume of the acid.

While it is conceivable that any one of several mineral acids could be employed, either alone or in mixtures, HCl is the most suitable from an operational and economic standpoint. The preferred concentration of the aqueous HCl solution should be approximately 15%, but higher or lower concentrations may be used under certain circumstances.

The water soluble, organic compound designated as component II functions in a dual role, both as an acid retarder and as an emulsifier. A preferred composition would be an alcohol sulfate derived from the reaction between straight chain primary alcohols having an average molecular weight of 200–210 with chlorosulfonic acid which is subsequently neutralized with a nitrogen base of the morpholene type. This compound is commercially available as a solution in an organic solvent containing 56% of the neutralized alcohol sulphate as prepared commercially. Another such composition is dodecylbenzenesulfonic acid in solution in substantially equal parts of water and isopropanol. Typically the solution contains 60% of the acid. It too is commercially available.

The component identified as III is a mixture of one or more acetylenic alcohols, a quaternary amine or a heterocyclic amine, and a surfactant in an organic solvent. This component also serves a dual purpose, both as a corrosion inhibitor for the acid and as an emulsifier. While it is regarded primarily as a corrosion inhibitor, the presence of a high HLB (hydrophile-lipophile balance) surfactant makes it an effective emulsifier in this system. The surfactant, having an HLB of from 10 to 20 as defined by Atlas Chemical Industries, Inc., Wilmington, Del., comprises approximately 20% by weight of the component III mixture, but this ratio can be altered to give more emulsification and less corrosion inhibiting or vice versa. The mixtures designated component III are commercially available.

The hydrocarbon oils can be selected from the group consisting of kerosene, diesel oil, various crude oils, and most treated crude oils. It should be noted that some treated crude oils contain additives which prevent emulsification and, therefore, cannot be used for this system.

Another important aspect of the invention concerns the method of preparing the emulsion. Since it is sometimes difficult to obtain a stable oil-and-acid emulsion using the proportions of oil, acid, and additives defined above, the method of preparing such an emulsion is quite critical. The emulsion is obtained by carrying out the following steps in the proper sequence:

(1) The proper proportion of hydrocarbon oil (5 to 25% by volume based on amount of acid to be used) is agitated in a tank or other suitable container.

(2) While the agitation is in progress, the additives, namely the components identified herein before as II and III, are added to the hydrocarbon oil. The order of mixing there two components with the oil is not critical.

(3) Agitation is continued until the additives are thoroughly mixed to give a uniform mixture.

(4) Continuing agitation of the mixture, the aqueous mineral acid is then added to the batch at a very uniform rate, such that, under the conditions of agitation, the acid is thoroughly and entirely incorporated in the emulsion.

This particular mixing procedure results in a very fluid, stable, oil-and-acid emulsion.

To further illustrate the mixing procedure, the following example sets out the process of preparing the stable oil-and-acid emulsion in terms of actual quantities and specific components.

EXAMPLE I

One hundred and sixty five gallons of kerosene are placed in a large mixing tank which is provided with a stirring mechanism to produce substantial agitation of the fluid. While continuing the agitation of the kerosene, 10 gallons of the foregoing neutralized alcohol sulfate is added, followed by 5 gallons of a mixture of acetylenic alcohol and quaternary amine in an organic solvent. The last two components are thoroughly mixed in the kerosene for approximately two minutes until they are uniformly dispersed in the kerosene. While continuing agitation, 820 gallons of a 15% aqueous HCl solution are continuously added to the tank at a uniform rate in a period of 15 minutes. An emulsion of oil and aqueous solution is formed.

In order to provide illustrative examples which demonstrate the improved properties of the well treating compositions, such as prepared in accordance with Example I, the following examples describe comparative tests using (1) an aqueous solution of HCl (15%), (2) a chemically retarded 15% aqueous hydrochloric acid, i.e. one in which 1% of a surfactant solution has been added to slow down the rate at which the acid attacks the formation and (3) the improved emulsion composition of the present invention. The surfactant referred to in (2) above is a sodium salt of an alkyl sulfonate present in the surfactant solution in a concentration of 37%.

EXAMPLE II

An one inch cube of very uniform marble was placed in a reaction chamber or autoclave in which the temperature and pressure could be closely controlled. The acidizing solution was then introduced into the chamber and at the end of five minutes the cube was removed. The weight loss due to the attack by the treating fluid was noted along with the percentage of acid reacted during the time period. In a test conducted at 75° F. for a period of five minutes at one atmosphere pressure, the 15% aqueous HCl treatment resulted in a weight loss of 1.5325 gm./in.$^2$ and 30.3% of the acid was reacted. Under the same conditions using the chemically retarded acid, the weight loss was 1.0055 gm./in.$^2$ and 23.9% of the acid was reacted. Again, under the same conditions, but using the improved emulsion of the Example I, the weight loss was .2255 gm./in.$^2$ and only 1.04% of the acid was reacted.

EXAMPLE III

Using the same test set-up as described in Example II, a test was run at 150° F. for twenty-four minutes at 1,000 p.s.i., using the three different treating solutions. In analyzing the percent of acid reacted, the values were 100% for both the aqueous HCl and the chemically retarded HCl, while the emulsion prepared in accordance with Example I showed a negligible percentage of reacted acid, approximately 1%.

These results indicate that the reaction rate for the reaction using the emulsion of Example I is much lower than that of the aqueous HCl and the retarded acid compositions.

For a typical well treatment operation, the components discussed above are preferably used in the proportions given, but it should be understood that the proportions may be altered to some degree depending upon the time and the amount of retardation required, and also depending upon the temperature of the well at the treating level. At low temperatures, the reaction proceeds at such a very slow rate that it may be desirable to add from .05 to .7% of a demulsifier to break the emulsion and thereby speed up the reaction. A typical demulsifier is a solution of ammonium-amine salts of alkyl sulfonic acids and oxyalkylated phenolic resins. The following table illustrates the time required to break the emulsion at 75° F. using a demulsifier of the above type.

*Table I*

| Amount of demulsifier, gal./1000 gal. acid: | Break time (Min.) |
|---|---|
| 2.0 | — |
| 3.0 | 310 |
| 4.0 | 120 |
| 4.5 | 42 |
| 5.0 | 25 |
| 5.5 | 6 |
| 6.0 | 4 |

At high temperature, the reaction with calcareous and similar formations may proceed at too fast a rate and it may be desirable to add additional surfactant to slow down the reaction rate.

EXAMPLE IV

One hundred and sixty five gallons of diesel fuel No. 2 are placed in a large mixing tank which is provided with a stirring mechanism to produce substantial agitation of the fluid. While continuing the agitation of the diesel fuel, 8 gallons of a 60% solution of dodecylbenzenesulfonic acid is added, followed by 4 gallons of a mixture of acetylenic alcohol and heterocyclic amines in an organic solvent. The last two components are thoroughly mixed in the diesel fuel for approximately two minutes until they are uniformly dispersed in the diesel fuel. While continuing agitation, 484 gallons of water are continuously added to the tank at a uniform rate in a period of 15 minutes. Thereafter, 339 gallons of 34.5% aqueous HCl solution are continuously added at a uniform rate to the tank in 12 minutes, while continuing the agitation. An emulsion of aqueous solution in oil is formed.

A number of such batches were made up, from which a volume of 3,700 gallons of the emulsion were pumped into a well wherein the producing formation was dolomitic (Trenton dolomite). Immediately before such treatment the well was pumping 114 barrels of oil and 132 barrels of water per day. One week after the treatment, the well pumped 204 barrels of oil and 288 barrels of water per day.

While this invention has been described in connection with certain specific examples thereof, it is to be understood that this is by way of illustration and not by way of limitation; and the scope of this invention is defined solely by the appended claims which should be construed as broadly as the prior art will permit.

I claim:

1. A method of acidizing calcareous and similar earth formation traversed by a well which comprises:
   (a) admixing an aqueous solution of hydrochloric acid, an emulsifying and acid retarding agent selected from the group consisting of dodecylbenzenesulfonic acid and the neutralized reaction product of a straight chain primary alcohol reacted with chlorosulfonic acid, a corrosion inhibitor, a surfactant, and a hydrocarbon oil to form an emulsion;
   (b) injecting said emulsion into the well and into contact with the calcareous formation; and
   (c) forcing said emulsion into the formation.

2. A method of acidizing calcareous and similar earth formations traversed by a well which comprises:
   (a) admixing an aqueous solution of hydrochloric acid, from about 0.1% to about 1.5% by volume based on the volume of the aqueous solution of hydrochloric acid of an emulsifying and acid retarding agent comprising dodecylbenzenesulfonic acid in 60% solution, from about 0.1% to about 3.0% by volume based on the volume of the aqueous solution of hydrochloric acid of a corrosion inhibitor, a surfactant, and from about 5% to about 25% by volume based on the volume of the aqueous solution of hydrochloric acid of a hydrocarbon oil to form an emulsion;
   (b) injecting said emulsion into the well and into contact with the calcareous formation; and
   (c) forcing said emulsion into the formation.

3. A method of acidizing calcareous and similar earth formations traversed by a well which comprises:
   (a) admixing an aqueous solution of hydrochloric acid, from about 0.1% to about 1.5% by volume based on the volume of the aqueous solution of hydrochloric acid of an emulsifying and retarding agent comprising dodecylbenzensulfonic acid in 60% solution, from about 0.1% to about 3.0% by volume based on the volume of the aqueous solution of hydrochloric acid of a corrosion inhibitor comprising an acetylenic alcohol and an amine selected from the group consisting of quaternary amines and heterocyclic amines, a surfactant, and from about 5% to about 25% by volume based on the volume of the aqueous solution of hydrochloric acid of a hydrocarbon oil to form an emulsion;
   (b) injecting said emulsion into the well and into contact with the calcareous formation; and
   (c) forcing said emulsion into the formation.

4. A method of acidizing calcareous and similar earth formations traversed by a well which comprises:
   (a) admixing an aqueous solution of hydrochloric acid, from about 0.1% to about 1.5% by volume based on the volume of the aqueous solution of hydrochloric acid of an emulsifying and retarding agent comprising an alcohol sulfate derived from the reaction between straight chain primary alcohols having an average molecular weight of 200–210 with chlorosulfonic acid which is subsequently neutralized with a morpholene type nitrogen base, the emulsifying and retarding agent being in 56% solution, from about 0.1% to about 3.0% by volume based on the volume of the aqueous solution of hydrochloric acid of a corrosion inhibitor, a surfactant, and from about 5% to about 25% by volume based on the volume of the aqueous solution of hydrochloric acid of a hydrocarbon oil to form an emulsion;
   (b) injecting said emulsion into the well and into contact with the calcareous formation; and
   (c) forcing said emulsion into the formation.

5. A method of acidizing calcareous and similar earth formations traversed by a well which comprises:
   (a) admixing an aqueous solution of hydrochloric acid, from about 0.1% to about 1.5% by volume based on the volume of the aqueous solution of hydrochloric acid of an emulsifying and retarding agent comprising an alcohol sulfate derived from the reaction between straight chain primary alcohols having an average molecular weight of 200–210 with chlorosulfonic acid which is subsequently neutralized with a morpholene type nitrogen base, the emulsifying and retarding agent being in 56% solution, from about 0.1% to about 3.0% by volume based on the volume of the aqueous solution of hydrochloric acid of a corrosion inhibitor comprising an acetylenic alcohol and an amine selected from the group consisting of quaternary amines and heterocyclic amines, a surfactant, and from about 5% to about 25% by volume based on the volume of the aqueous solution of hydrochloric acid of a hydrocarbon oil to form an emulsion;
   (b) injecting said emulsion into the well and into contact with the calcareous formation; and
   (c) forcing said emulsion into the formation.

References Cited

UNITED STATES PATENTS

| | | | |
|---|---|---|---|
| 2,681,889 | 6/1954 | Menaul | 166—42 |
| 2,721,174 | 10/1955 | Brainerd | 166—42 |
| 2,802,531 | 8/1957 | Cardwell | 252—8.55 |
| 3,042,610 | 7/1962 | Dunlap | 252—8.55 |
| 3,122,204 | 2/1964 | Oakes | 166—42 |
| 3,197,403 | 7/1965 | Riggs | 252—8.55 |
| 3,233,672 | 2/1966 | Carpenter | 166—42 |

CHARLES E. O'CONNELL, *Primary Examiner.*

NILE C. BYERS, *Examiner.*